(12) United States Patent
Yamagishi

(10) Patent No.: US 12,260,834 B2
(45) Date of Patent: Mar. 25, 2025

(54) CONTROL DEVICE, CONTROL METHOD, AND DISPLAY SYSTEM

(71) Applicant: SOCIONEXT INC., Kanagawa (JP)

(72) Inventor: Nobutaka Yamagishi, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 0 days.

(21) Appl. No.: 18/244,781

(22) Filed: Sep. 11, 2023

(65) Prior Publication Data

US 2023/0419917 A1    Dec. 28, 2023

Related U.S. Application Data

(60) Division of application No. 17/381,093, filed on Jul. 20, 2021, now abandoned, which is a continuation of
(Continued)

(51) Int. Cl.
*G09G 3/24* (2006.01)
*B60K 35/21* (2024.01)
*B60K 35/22* (2024.01)
*B60K 35/28* (2024.01)
*B60K 35/60* (2024.01)
(Continued)

(52) U.S. Cl.
CPC .......... *G09G 3/3426* (2013.01); *B60K 35/60* (2024.01); *G09G 5/10* (2013.01); *B60K 35/213* (2024.01); *B60K 35/22* (2024.01); *B60K 35/28* (2024.01); *B60K 2360/1523* (2024.01); *B60K 2360/167* (2024.01); *B60K 2360/349* (2024.01);
(Continued)

(58) Field of Classification Search
None
See application file for complete search history.

(56) References Cited

U.S. PATENT DOCUMENTS 6,873,341 B1    3/2005  Adams et al.
2005/0104837 A1    5/2005  Baik et al.
(Continued)

FOREIGN PATENT DOCUMENTS

CN    1662944 A    8/2005
EP    1376521 A1    1/2004
(Continued)

OTHER PUBLICATIONS

Extended European Search Report dated Jul. 19, 2022 issued in corresponding European Patent Application No. 19911784.7.
(Continued)

*Primary Examiner* — Christopher R Lamb
(74) *Attorney, Agent, or Firm* — Rimon P.C.

(57) ABSTRACT

A control device that executes a local dimming process of a display, the control device, includes a memory; and a processor configured to execute a process including identifying a changed area in which an image is changed in a frame to be displayed on the display, analyzing, in a case where the changed area is identified, every time a frame to be displayed on the display is received, the image in the changed area in the received frame, in a corresponding one of first units for processing so that the image in the changed area is analyzed in the first units for processing over multiple frames by time division processing, and generating control information for controlling the local dimming process for a corresponding area on the display, every time an analysis result with respect to the image in the first unit of processing is output.

20 Claims, 13 Drawing Sheets

Related U.S. Application Data application No. PCT/JP2019/002468, filed on Jan. 25, 2019.

(51) Int. Cl.
*G09G 3/34* (2006.01)
*G09G 5/10* (2006.01)

(52) U.S. Cl.
CPC . *G09G 2320/0686* (2013.01); *G09G 2360/16* (2013.01); *G09G 2380/10* (2013.01)

(56) References Cited

U.S. PATENT DOCUMENTS

| | | |
|---|---|---|
| 2005/0253972 A1 | 11/2005 | Wwitbruch et al. |
| 2010/0328535 A1 | 12/2010 | Okui et al. |
| 2012/0139974 A1 | 6/2012 | Sakai et al. |
| 2013/0044146 A1 | 2/2013 | Kurokawa et al. |
| 2014/0198123 A1 | 7/2014 | Shibamiya et al. |

FOREIGN PATENT DOCUMENTS

| | | |
|---|---|---|
| EP | 2461316 A1 | 6/2012 |
| JP | 2005-531799 A | 10/2005 |
| JP | 2008-076784 A | 4/2008 |
| JP | 2011-232483 A | 11/2011 |
| JP | 2013-020263 A | 1/2013 |
| JP | 2013-068937 A | 4/2013 |
| JP | 2016-018149 A | 2/2016 |

OTHER PUBLICATIONS

Non-Final Office Action issued in U.S. Appl. No. 17/381,093, dated May 20, 2022.
Final Office Action issued in U.S. Appl. No. 17/381,093, dated Oct. 14, 2022.
Non-Final Office Action issued in U.S. Appl. No. 17/381,093, dated Jan. 20, 2023.
Final Office Action issued in U.S. Appl. No. 17/381,093, dated May 11, 2023.
Japanese Office Action issued in corresponding Japanese Patent Application No. 2020-567332, dated Sep. 6, 2022, with English translation.
Chinese Office Action issued in corresponding Chinese Patent Application No. 201980090060.8, dated Sep. 7, 2022, with English translation.
Chinese Office Action issued in corresponding Chinese Patent Application No. 201980090060.8, dated Jan. 28, 2023, with English translation.
International Search Report of corresponding International Application No. PCT/JP2019/002468, dated Mar. 5, 2019, with English translation.
Written Opinion of corresponding International Application No. PCT/JP2019/002468, dated Mar. 5, 2019, with partial English translation.
Chinese Office Action mailed on Mar. 31, 2022 issued in corresponding Chinese Patent Application No. 201980090060.8, with English translation.
Office Action received in corresponding European Patent Application No. 19 911 784.7, dated Jan. 9, 2025.

| | | DISPLAY MODE AFTER TRANSITION | | |
| --- | --- | --- | --- | --- |
| | | MODE 1 | MODE 2 | MODE 3 |
| CURRENT DISPLAY MODE (BEFORE TRANSITION) | MODE 1 | NO CHANGE | ALL 1 | ALL 2 |
| | MODE 2 | ALL 1 | NO CHANGE | CENTER |
| | MODE 3 | ALL 2 | CENTER | NO CHANGE |

FIG.10
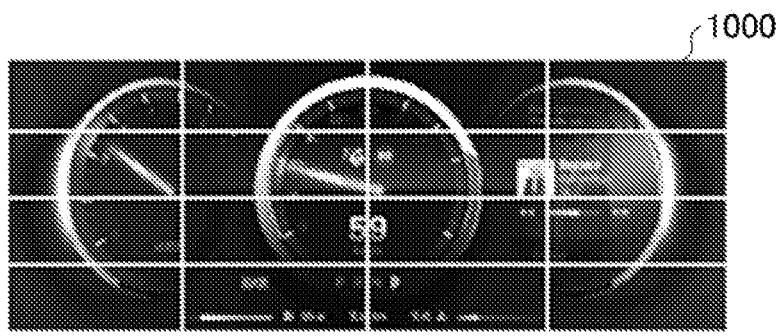
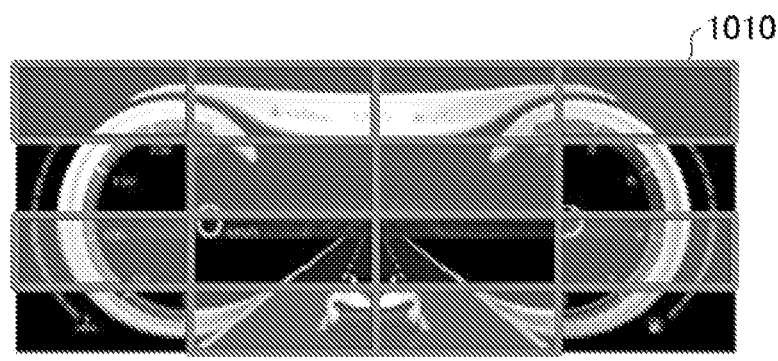
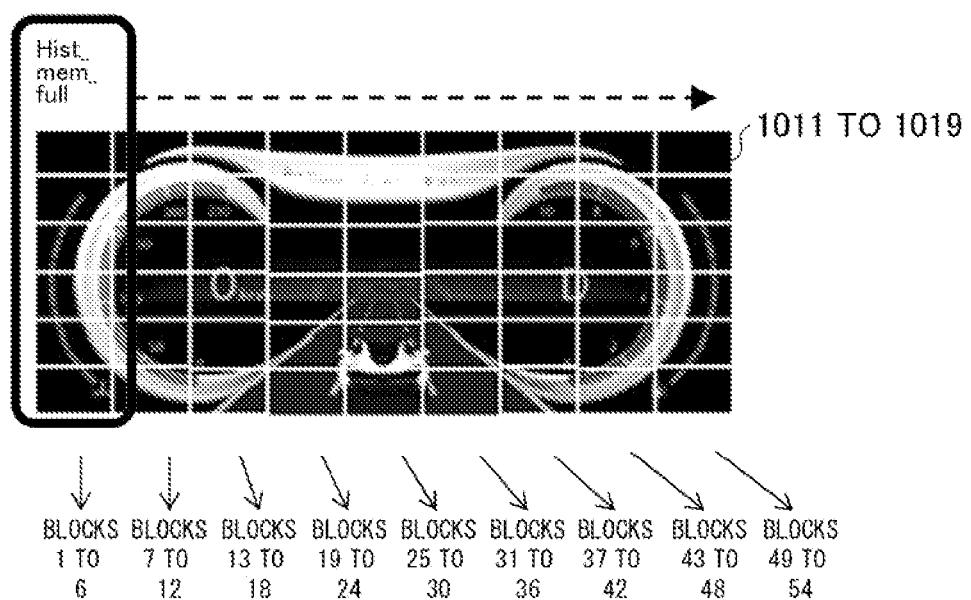

FIG.11
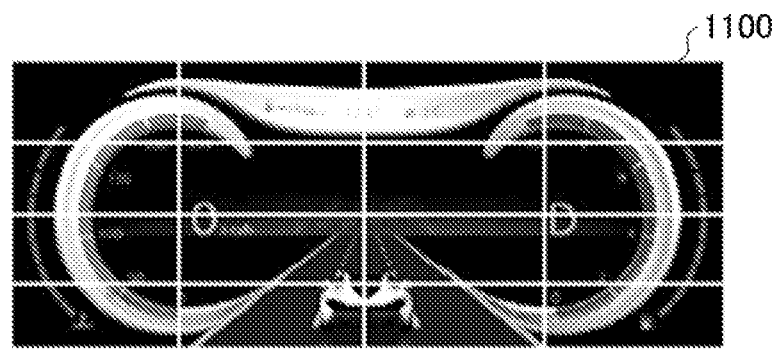
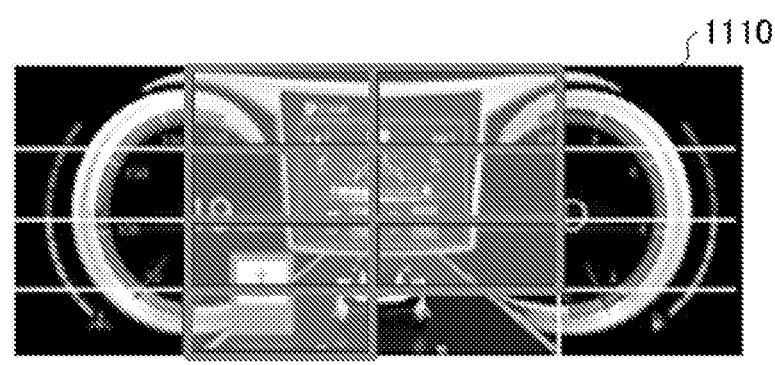
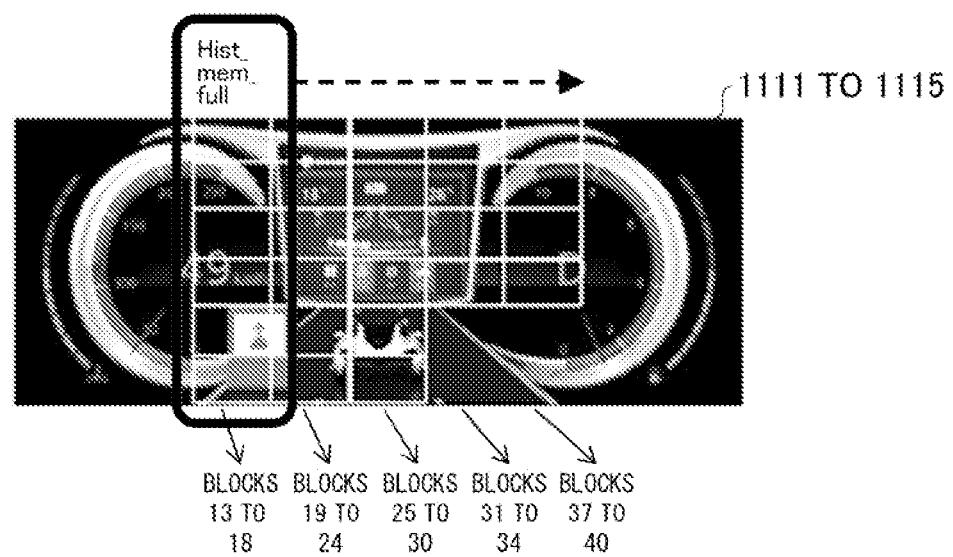

CONTROL DEVICE, CONTROL METHOD, AND DISPLAY SYSTEM

CROSS-REFERENCE TO RELATED APPLICATIONS

The present application is a divisional of U.S. application Ser. No. 17/381,093 filed on Jul. 20, 2021, which is a continuation application of International Application PCT/JP2019/002468 filed on Jan. 25, 2019, and designated the U.S., the entire contents of which are incorporated herein by reference.

FIELD

The present disclosure relates to a control device, a control method, and a display system.

BACKGROUND

Conventionally, in the field of liquid crystal displays, local dimming techniques that control backlights of direct-type LEDs (Light Emitting Diodes) to locally change the amount of light to be emitted, have been known.

According to the techniques, for example, in an in-vehicle display system, by generating control information corresponding to an image on a head unit side to be transmitted to each liquid crystal display, said each liquid crystal display can display an image with high contrast and high image quality.

Meanwhile, specifications and characteristics of in-vehicle liquid crystal displays vary depending on types of devices (applications), and hence, it is necessary to transmit different control information with respect to different types of liquid crystal displays (applications).

Therefore, in an in-vehicle display system in which multiple liquid crystal displays are connected, it has been desired to generate control information for executing a local dimming process on a liquid crystal display side rather than on the head unit side.

RELATED ART DOCUMENTS

Patent Documents

[Patent Document 1] Japanese Laid-Open Patent Application No. 2013-20263

However, if attempting to generate control information corresponding to an image in real time on a liquid crystal display side, the circuit size on the liquid crystal display side increases, and hence, the cost increases inevitably.

SUMMARY

According to one embodiment, a control device that executes a local dimming process of a display, the control device, includes a memory; and a processor configured to execute a process including
identifying a changed area in which an image is changed in a frame to be displayed on the display,
analyzing, in a case where the changed area is identified, every time a frame to be displayed on the display is received, the image in the changed area in the received frame, in a corresponding one of first units for processing so that the image in the changed area is analyzed in the first units for processing over multiple frames by time division processing, and
generating control information for controlling the local dimming process for a corresponding area on the display, every time an analysis result with respect to the image in the first unit of processing is output.

The object and advantages in the present embodiments will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 10 is a first diagram illustrating specific examples of a process of obtaining histograms;

FIG. 11 is a second diagram illustrating specific examples of a process of obtaining histograms;

DESCRIPTION OF EMBODIMENTS

In the following, embodiments will be described with reference to the accompanying drawings. In a display system executing a local dimming process according to an embodiment, the circuit size on the display side can be reduced. Note that throughout the description and the drawings, for elements having substantially the same functional configurations, the same reference codes are allocated to omit duplicate descriptions.

First Embodiment

<System Configuration of Display System>

First, a system configuration of an in-vehicle display system that includes a head unit and multiple liquid crystal displays, and executes a local dimming process will be described. Note that here, first, (1) a display system according to a comparative example that generates control information (information generated based on an image to be displayed on a liquid crystal display and used for controlling backlights in a local dimming process) on the head unit side will be described. Next, (2) a display system according to the first embodiment that generates control information on a liquid crystal display side will be described.

However, for both display systems, for the sake of simplifying the description, only one of the multiple liquid crystal displays will be described.

(1) System Configuration of the Display System of the Comparative Example

Figure 1:
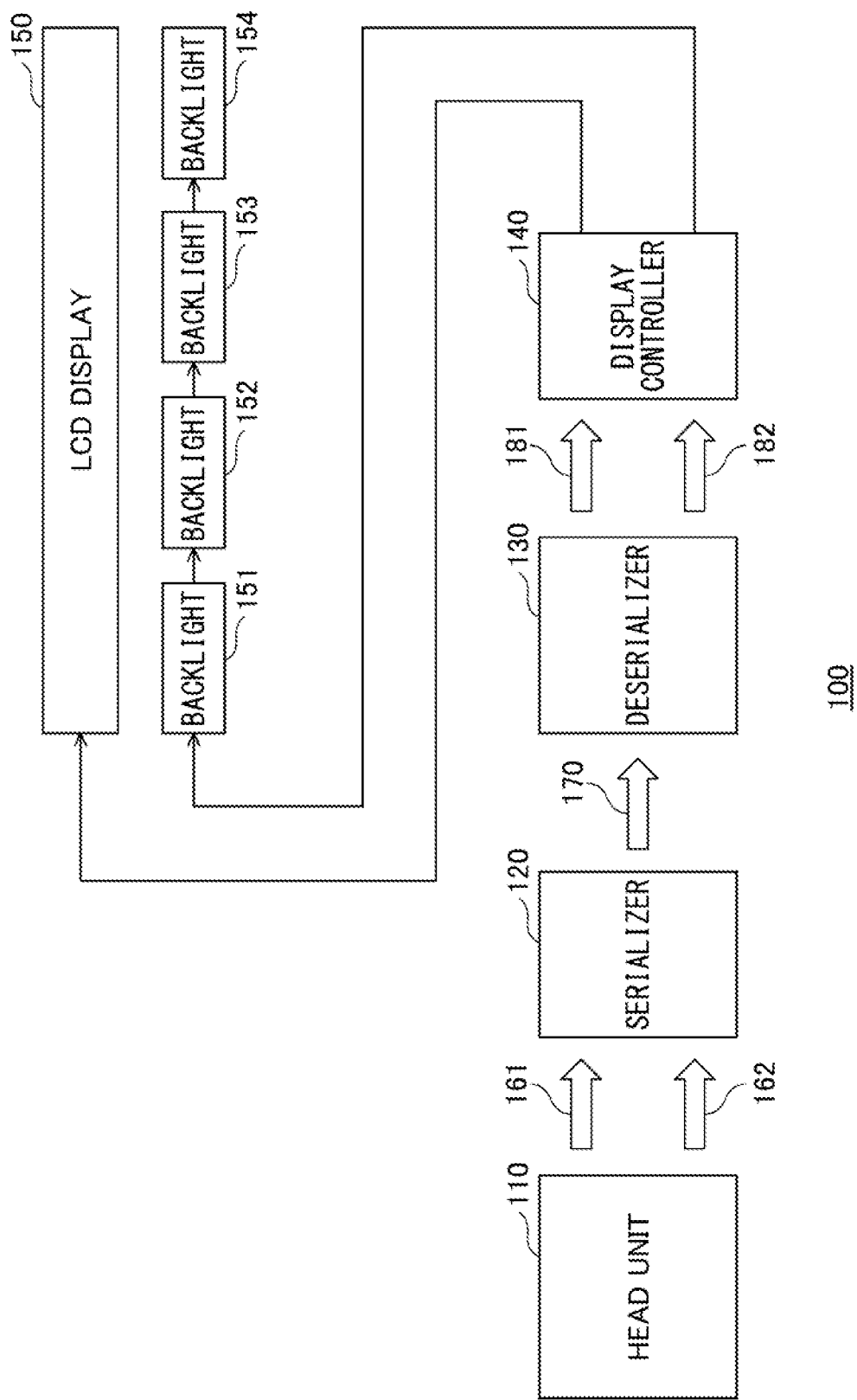
FIG. 1 is a diagram illustrating a system configuration of a display system of a comparative example.

FIG. 1 is a diagram illustrating a system configuration of a display system according to the comparative example. As illustrated in FIG. 1, the display system of the comparative example 100 that generates control information on the head unit side, includes a head unit 110, a serializer 120, a deserializer 130, a display controller 140, and a liquid crystal display 150.

The head unit 110 generates an image to be displayed on the liquid crystal display 150. Also, the head unit 110 has a local dimming control function, adjusts the image quality of a generated image, and generates control information based on the type of liquid crystal display 150 (cluster meter, HUD (Head Up Display), etc.). Also, the head unit 110 outputs a quality-adjusted image and generated control information to the serializer 120 (see reference codes 161 and 162).

The serializer 120 is a circuit that serializes signals of an image and control information output from the head unit 110, to transmit the serialized signals on a single transmission line (video link). The serializer 120 transmits the serialized signals to the deserializer 130 via the video link (e.g., LVDS (Low Voltage Differential Signaling), APIX (registered trademark), etc.) (see a reference code 170).

The deserializer 130 is a circuit that parallelizes the serialized signals transmitted via the video link. The deserializer 130 outputs an image and control information obtained by parallelization to the display controller 140 (see reference codes 181 and 182).

The display controller 140 displays an image on the liquid crystal display 150, and controls backlights 151 to 154 included in the liquid crystal display 150, based on the control information. In this way, the display system 100 of the comparative example can implement a local dimming process.

(2) System Configuration of a Display System According to the First Embodiment

Figure 2:
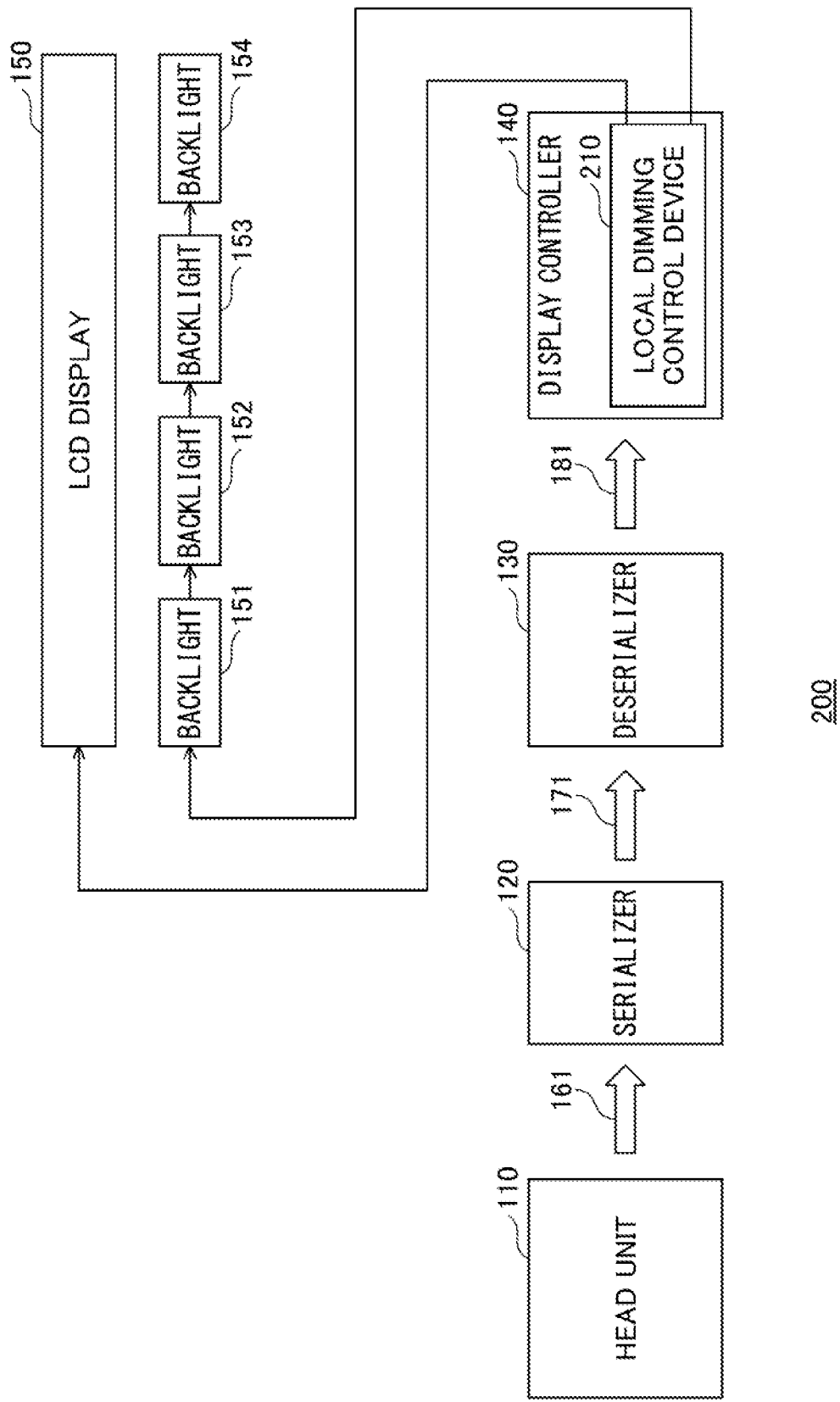
FIG. 2 is a diagram illustrating a system configuration of a display system according to a first embodiment.

FIG. 2 is a diagram illustrating a system configuration of a display system according to the first embodiment. A difference from FIG. 1 is that in the case of a display system 200 according to the first embodiment, the display controller 140 includes a local dimming control device 210.

The local dimming control device 210 analyzes an image received by the display controller 140, adjusts the image quality based on analysis results, and generates control information. Also, the local dimming control device 210 displays a quality-adjusted image on the liquid crystal display 150, and controls backlights 151 to 154 included in the liquid crystal display 150, based on the generated control information. In this way, according to the first embodiment, the display system 200 can implement a local dimming process.

In this way, by adopting a configuration in which the local dimming control device 210 is provided on the liquid crystal display 150 side (the destination of the video link) to generate control information on the liquid crystal display 150 side, for example, the following advantages are obtained:

it is not necessary to generate a number of control information items corresponding to the types of connected liquid crystal displays as would be required in the case of generating the control information on the head unit 110 side; therefore, it is simply necessary to generate control information corresponding to one type of liquid crystal display; and in the video link, it becomes unnecessary to allocate a bandwidth to transmit control information.

Note that in the display system 200, instead of the liquid crystal display 150, a display adopting a different displaying scheme may be used as long as it is a display in which a local dimming process can be applied.

<Overview of Local Dimming Process Executed by Local Dimming Control Device>

Figure 3:
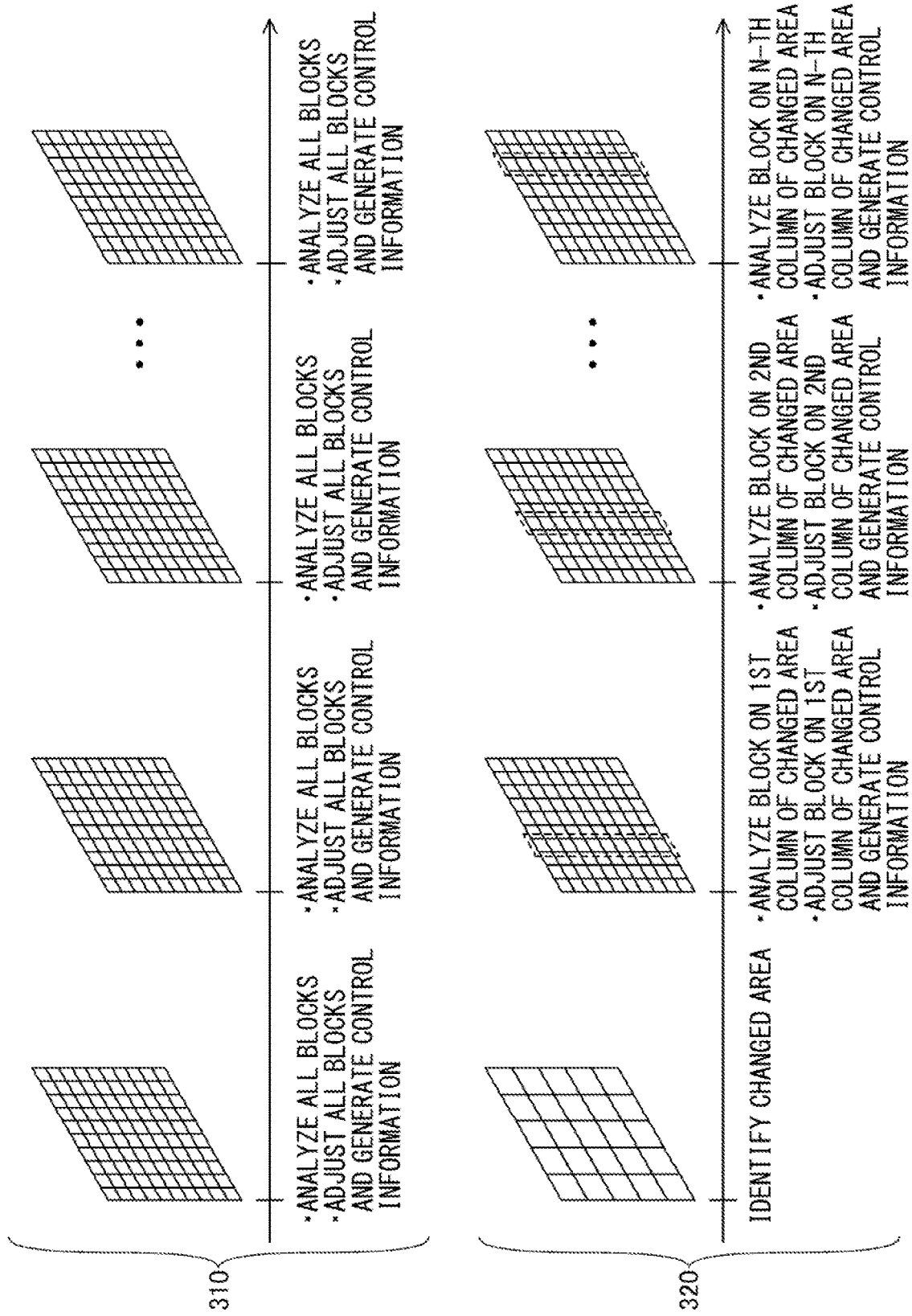
FIG. 3 is a diagram illustrating an overview of a local dimming process executed by a local dimming control device of the comparative example, and an overview of a local dimming process executed by a local dimming control device according to the first embodiment.

Next, an overview of a local dimming process executed by the local dimming control device 210 will be described. Note that here, first, (1) an overview of a local dimming process executed by a local dimming control device of the comparative example will be described, and then, (2) an overview of the local dimming control device according to the first embodiment will be described. The description will be made with reference to FIG. 3. FIG. 3 is a diagram illustrating an overview of a local dimming process executed by a local dimming control device of the comparative example, and an overview of a local dimming process executed by the local dimming control device according to the first embodiment.

(1) Overview of a Local Dimming Process Executed by the Local Dimming Control Device of the Comparative Example In FIG. 3, a reference code 310 indicates an overview of a local dimming process executed by the local dimming control device of the comparative example.

In the reference code 310, the horizontal axis represents time, and frames shown associated with the respective times represent frames received by the local dimming control device of the comparative example at the respective times.

As indicated with the reference code 310, the local dimming control device of the comparative example divides a received frame into multiple blocks depending on the hardware configuration such as the number of backlights, and analyzes the image in each block. Also, based on analysis results of the image, the local dimming control device of the comparative example adjusts the image quality of the respective blocks. Further, based on the analysis results of the image, the local dimming control device of the comparative example generates control information for controlling backlights corresponding to the respective blocks.

In this way, every time a frame is received, the local dimming control device of the comparative example analyzes all of the multiple blocks depending on the hardware configuration such as the number of backlights, and executes adjustment of the image quality and generation of the control information; therefore, in the case of the local dimming control device of the comparative examples, it is necessary to provide:

a large-capacity frame memory to hold frames; and a high-performance unit for analyzing all blocks at the same time every time a frame is received, and thereby, the circuit size becomes large, and the cost increases inevitably.

(2) Overview of a Local Dimming Process Executed by the Local Dimming Control Device According to the First Embodiment In contrast to the above, in FIG. 3, a reference code 320 indicates an overview of a local dimming process executed by the local dimming control device according to the first embodiment.

In the reference code 320, the horizontal axis represents time, and frames shown associated with the respective times represent frames received by the local dimming control device according to the first embodiment at the respective times.

As indicated with the reference code 320, the local dimming control device according to the first embodiment divides a received frame into multiple areas (where the size of an area>the size of a block), and determines whether there is a change in the image in each of the areas, to identify one or more changed areas.

Also, in the local dimming control device according to the first embodiment, for each identified area, every time a frame is received thereafter, blocks in the identified area are analyzed in predetermined units of processing (where a unit corresponds to a range surrounded by dashed lines, referred to as a "column", hereafter). Note that the column is defined as a unit of processing to cover portions of an image that can be analyzed simultaneously, and here, the column is determined by the processing capability of a unit for analyzing an image provided in the local dimming control device.

Also, the local dimming control device according to the first embodiment adjusts the image quality of an image in corresponding portions, every time an analysis result for one column is output. Further, the local dimming control device according to the first embodiment generates control information for controlling corresponding backlights, every time an analysis result for one column is output.

In this way, the local dimming control device according to the first embodiment,
- identifies each changed area, analyzes the image in the identified area, and executes adjustment of the image quality and generation of the control information; and
- every time a frame is received, analyzes the image column by column, and executes adjustment of the image quality and generation of the control information for the changed area over multiple frames (by time division processing).

In this way, by the local dimming control device according to the first embodiment, a large-capacity frame memory that would be required for holding frames becomes unnecessary, and the size of a unit for analyzing an image can be reduced. As a result, by the local dimming control device according to the first embodiment, the circuit size can be reduced.

<Functional Configuration of Local Dimming Control Device>

Next, a functional configuration of the local dimming control device 210 provided in the display system 200 will be described. Note that here, first, (1) a function configuration of the local dimming control device of the comparative example will be described, and then, (2) a functional configuration of the local dimming control device according to the first embodiment will be described.

Figure 4:
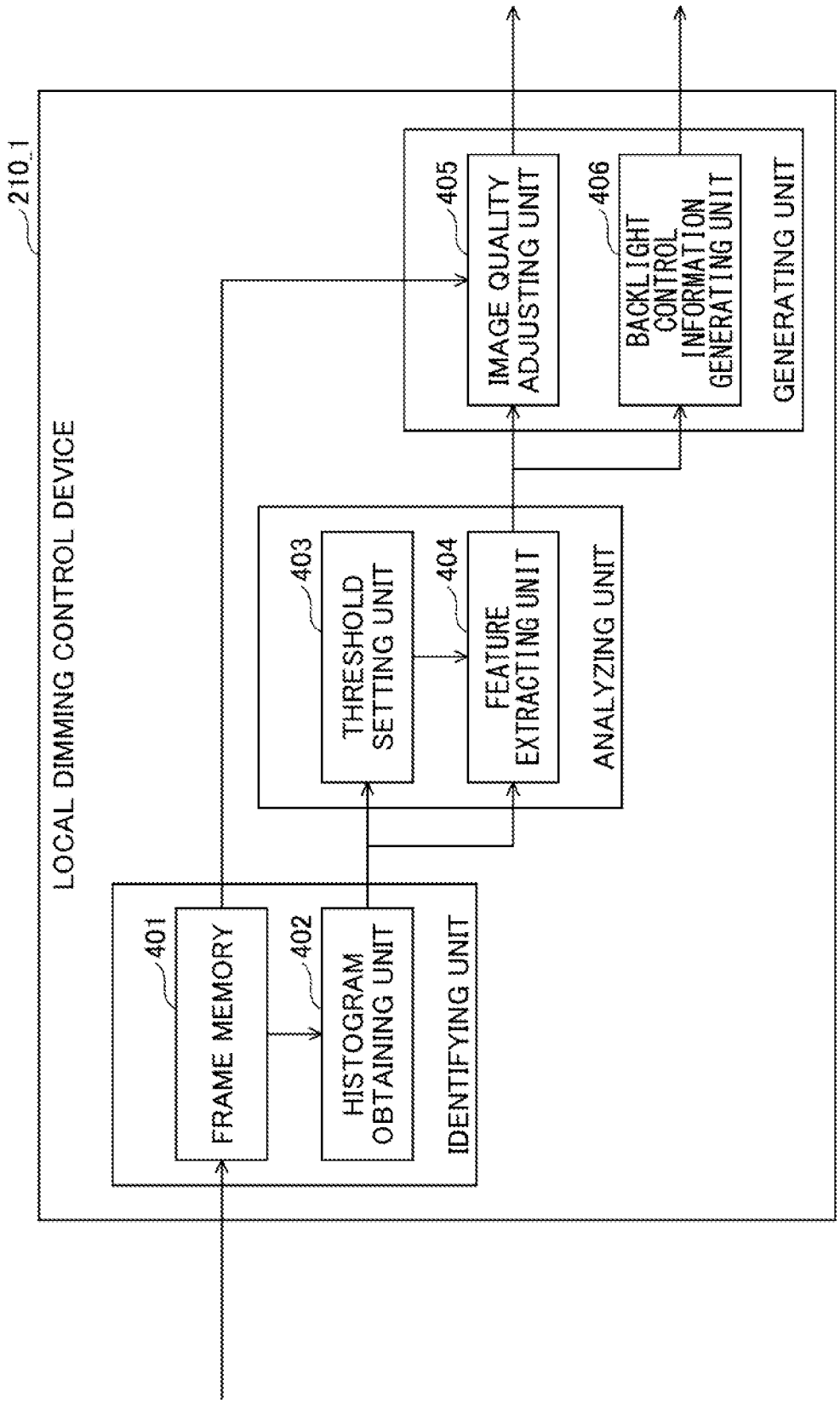
FIG. 4 is a diagram illustrating an example of a functional configuration of a local dimming control device of the comparative example.

(1) Function Configuration of the Local Dimming Control Device of the Comparative Example FIG. 4 is a diagram illustrating an example of a functional configuration of a local dimming control device of the comparative example. As illustrated in FIG. 4, a local dimming control device 210_1 of the comparative example includes an obtaining unit (a frame memory 401 and a histogram obtaining unit 402), an analyzing unit (a threshold setting unit 403 and a feature extracting unit 404), and a generating unit (an image quality adjusting unit 405 and a backlight control information generating unit 406).

The frame memory 401 accumulates frames received by the display controller 140.

The histogram obtaining unit 402 reads a frame to be processed out of the frame memory 401, counts the number of pixels of each tone for all blocks, and generates histograms.

The threshold setting unit 403 sets a threshold to be used by the feature extracting unit 404 when extracting features from the generated histograms, in the feature extracting unit 404.

Based on the threshold set by the threshold setting unit 403, the feature extracting unit 404 extracts features from the histograms of the respective blocks generated in the histogram obtaining unit 402, and outputs the features as analysis results to the image quality adjusting unit 405 and the backlight control information generating unit 406.

The image quality adjusting unit 405 reads a frame to be processed out of the frame memory 401, and the feature extracting unit 404 adjusts the image quality of each block based on a feature extracted from the block. Also, the image quality adjusting unit 405 outputs an image of the frame in which the image quality is adjusted in units of blocks, to the liquid crystal display 150.

In the feature extracting unit 304, based on the features extracted from the respective blocks, the backlight control information generating unit 406 generates control information for controlling backlights corresponding to the respective blocks. Also, the backlight control information generating unit 406 outputs the generated control information to the liquid crystal display 150.

Figure 5:
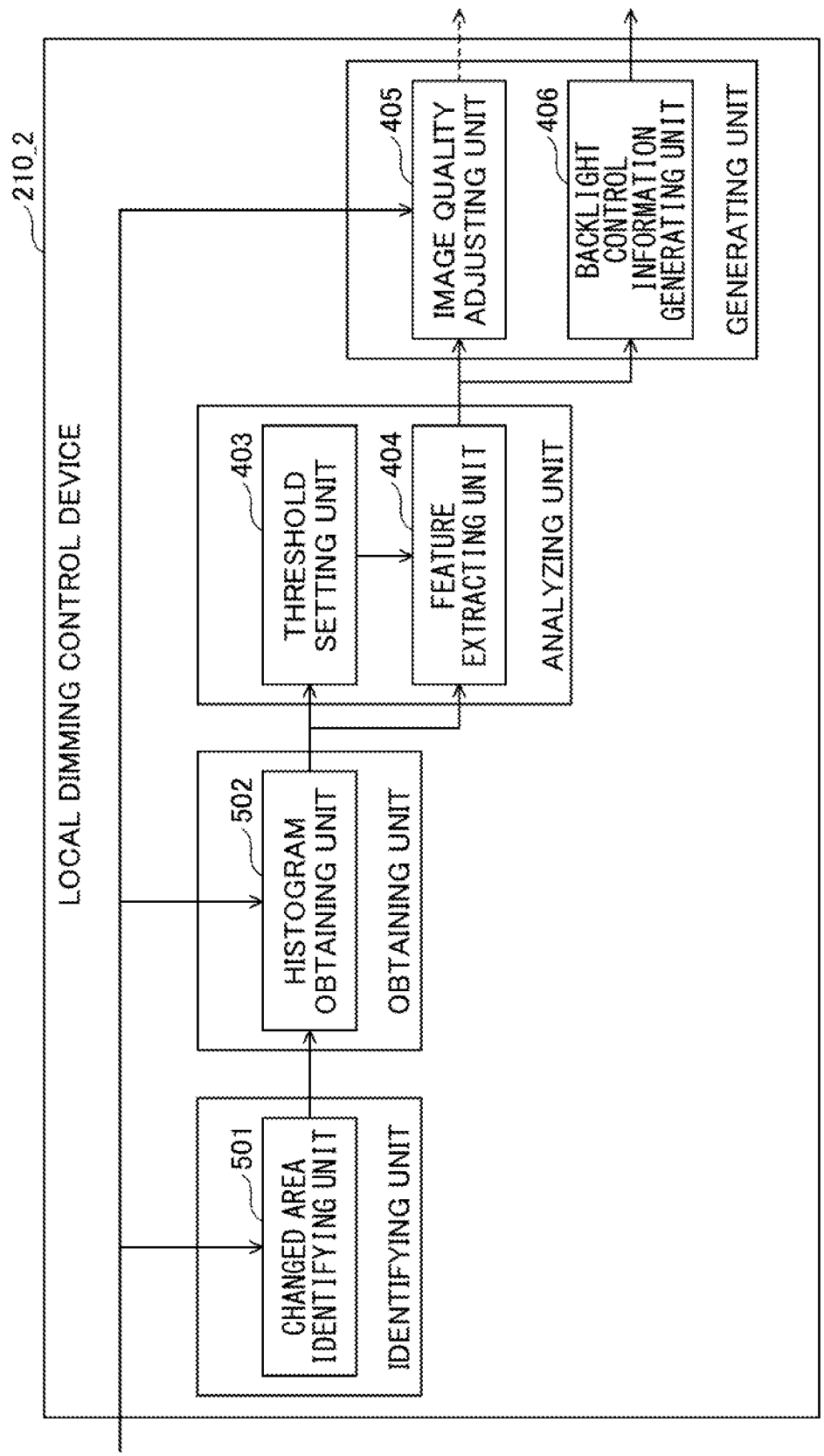
FIG. 5 is a diagram illustrating an example of a functional configuration of a local dimming control device according to the first embodiment.

(2) Functional Configuration of the Local Dimming Control Device According to the First Embodiment FIG. 5 is a diagram illustrating an example of a functional configuration of the local dimming control device according to the first embodiment. In the case of a local dimming control device 210_2 according to the first embodiment, differences from FIG. 4 are that the identifying unit including the changed area identifying unit 501 is provided, and that the obtaining unit does not include a frame memory 401.

The changed area identifying unit 501 divides a frame received by the display controller 140 into multiple areas, and determines whether there has been a change in the image in each of the areas. Also, the changed area identifying unit 501 identifies each area in which the image was changed, and informs the histogram obtaining unit 502 of the identified area.

After having been informed of one or more areas identified by the changed area identifying unit 501, every time a frame is received, the histogram obtaining unit 502 analyzes blocks in the identified areas column by column. Specifically, every time a frame is received, the histogram obtaining unit 502 generates histograms of blocks included in each column and informs the analyzing unit (the threshold setting unit 403 and the feature extracting unit 404) of the generated histograms.

<Hardware Configuration of Local Dimming Control Device>

Figure 6:
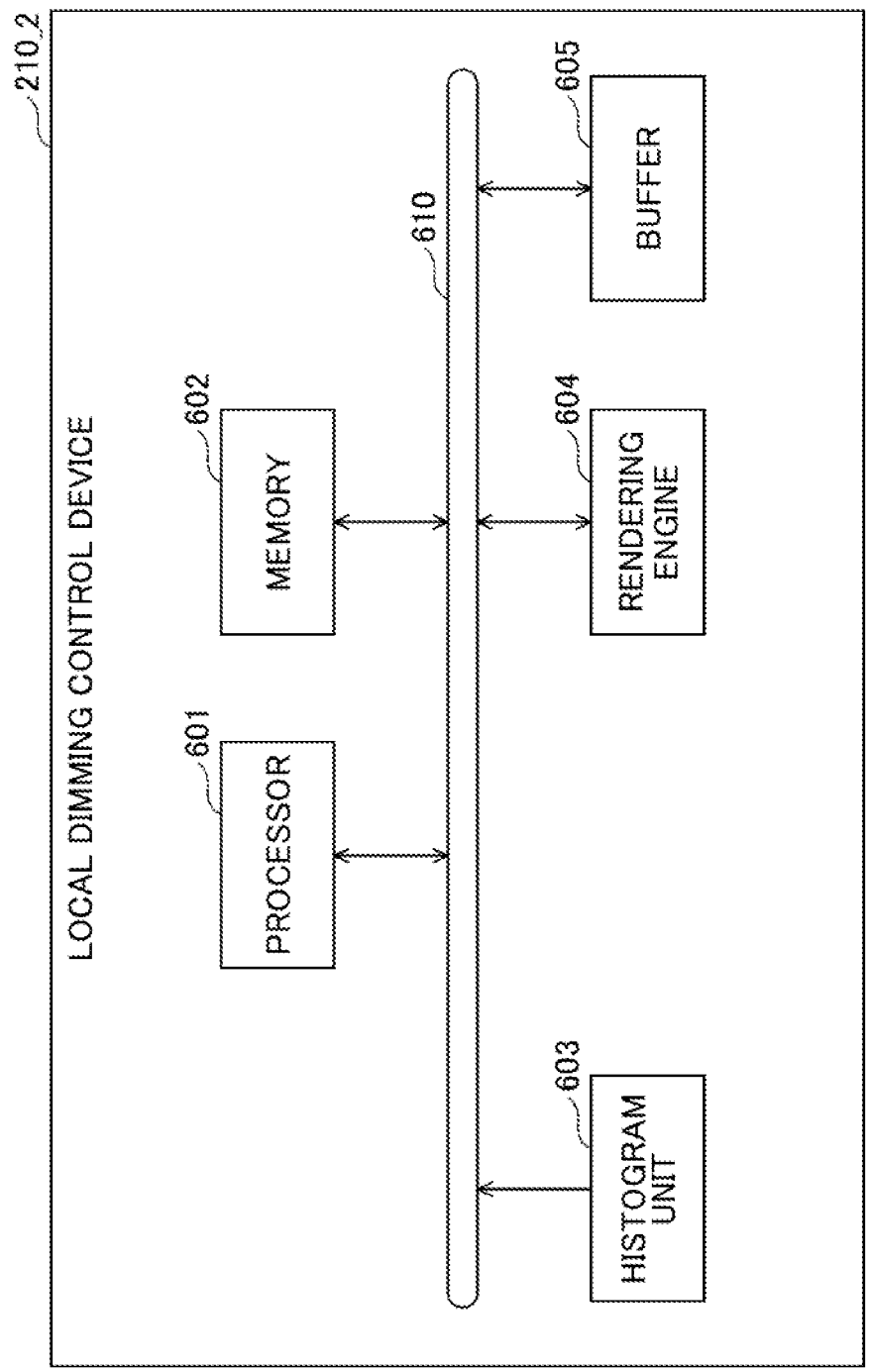
FIG. 6 is a diagram illustrating an example of a hardware configuration of a local dimming control device according to the first embodiment.

Next, a hardware configuration of the local dimming control device 210_2 according to the first embodiment will be described. FIG. 6 is a diagram illustrating an example of a hardware configuration of the local dimming control device according to the first embodiment.

As illustrated in FIG. 6, the local dimming control device 210_2 according to the first embodiment includes, for example, a processor 601, a memory 602, a histogram unit 603, a rendering engine 604, and a buffer 605. The hardware components of the local dimming control device 210_2 are interconnected via a bus 610.

The processor 601 is an arithmetic logic device that executes a local dimming control program stored in the memory 602. By having the processor 601 execute the local dimming control program, the functional configuration of the local dimming control device 210_2 described with using FIG. 5 is implemented.

The memory 602 stores the local dimming control program executed by the processor 601. Also, the memory 602 provides a work area when the processor 601 executes the local dimming control program.

The histogram unit 603 includes multiple counters. When a frame received by the display controller 140 is divided into units of areas or units of blocks, the multiple counters in the histogram unit 603 are allocated to the respective areas or the respective blocks. Also, each of the multiple counters included in the histogram unit 603 counts the number of pixels in each tonal range in the allocated area or block, to generate a histogram. Note that a tonal range indicates, for example, in the case where 256 tones ranging 0 to 255 are divided into subranges each including a predetermined number of tones, one of the subranges (a range constituted with the predetermined number of tones).

The rendering engine 604 renders a quality-adjusted image in the buffer 605. The buffer 605 holds an image rendered by the rendering engine 604. The image held in the buffer 605 is output to the liquid crystal display 150, and displayed by the liquid crystal display 150.

<Specific Examples of Display Modes>

Figure 7:
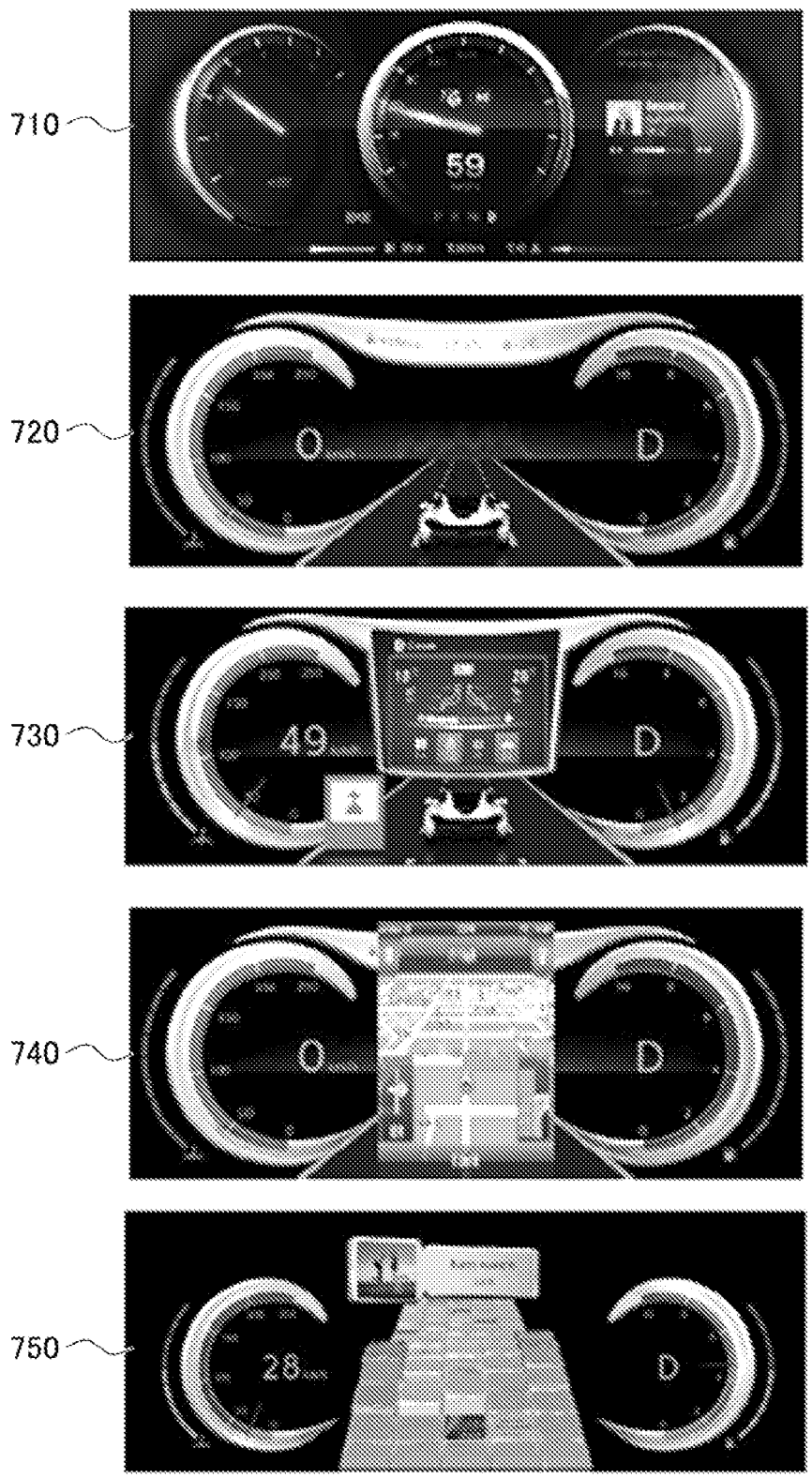
FIG. 7 is a diagram illustrating specific examples of display modes.

Next, display modes included in the head unit 110 of the display system 200 will be described. FIG. 7 is a diagram illustrating specific examples of display modes.

Among these, a reference code 710 indicates a diagram illustrating an example of a normal mode included in the head unit 110. As indicated with the reference code 710, in the normal mode, the liquid crystal display 150 displays a tachometer, a speedometer, and the like.

A reference code 720 indicates a diagram illustrating an example of a vehicle body information display mode included in the head unit 110. As indicated with the reference code 720, in the vehicle body information display mode, in addition to the tachometer and the speedometer, the liquid crystal display 150 displays information indicating states of the vehicle such as the speed value, shift position, and the like.

A reference code 730 indicates a diagram illustrating an example of a control mode included in the head unit 110. As indicated with the reference code 730, in the control mode, the central area of the liquid crystal display 150 displays information indicating a state of the air conditioning in the interior of the vehicle.

A reference code 740 indicates a diagram illustrating an example of a navigation mode included in the head unit 110. As indicated with the reference code 740, in the navigation mode, the central area of the liquid crystal display 150 displays a navigation screen.

A reference code 750 indicates a diagram illustrating an example of an audio mode included in the head unit 110. As indicated with the reference code 750, in the audio mode, the central area of the liquid crystal display 150 displays an audio screen.

According to the examples of screens indicated with the reference codes 710 to 750, in the case where the display mode transitions from the normal mode or the vehicle body information display mode to the control mode, the navigation mode, or the audio mode, the image changes in the central area. In other words, the image does not change other than in the central area.

On the other hand, in the case where the display mode transitions from one of the control mode, the navigation mode, and the audio mode to the normal mode or the vehicle body information display mode, the entire image changes.

In this way, in the case of the display mode included in the in-vehicle head unit 110, depending on the combination of display modes before and after a transition, the areas in which the image change vary. Therefore, as described above, the local dimming control device 210_2 according to the first embodiment causes the changed area identifying unit 501 to monitor a frame by units of areas. Then, in the case where the image is changed due to a transition of the display mode in the head unit 110, the changed area identifying unit 501 identifies which areas are changed.

<Description of Transition Pattern of Display Modes>

Figure 8:
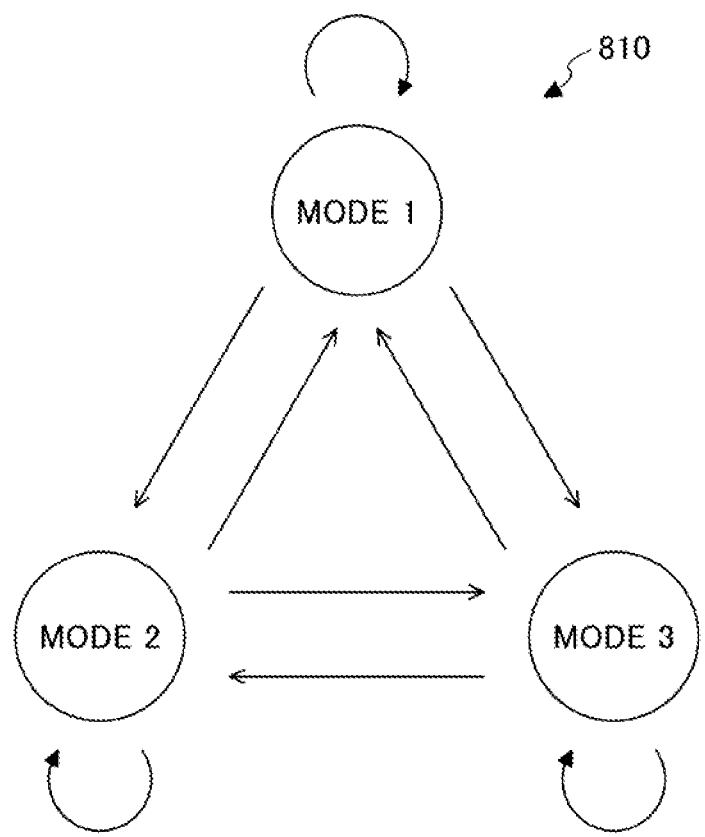
FIG. 8 is a diagram illustrating a transition pattern of display modes.

FIG. 8 is a diagram illustrating a transition pattern between display modes. Among these, Table 800 is a table that tabulates combinations of display modes before transitions and display modes after the transitions (combinations of areas in which the image changes).

Note that in Table 800, Mode 1 includes, for example, the normal mode; and Mode 2 includes, for example, the vehicle body information display mode. Also, in Table 800, Mode 3 includes, for example, the control mode, the navigation mode, and the audio mode.

As shown in Table 800, in the case where the display mode transitions from Mode 1 to Mode 2 or Mode 3, in all areas, change in the image becomes greater than or equal to a predetermined threshold value. Also, in the case where the display mode transitions from Mode 2 to Mode 1, and transitions from Mode 3 to Mode 1, in all areas, change in the image becomes greater than or equal to the predetermined threshold value.

On the other hand, in the case where the display mode transitions from Mode 2 to Mode 3 and transitions from Mode 3 to Mode 2, in central areas, change in the image becomes greater than or equal to the predetermined threshold value.

A reference code 810 indicates transition directions from display modes before transitions to display modes after the transitions. As illustrated in the reference code 810, the transition directions of the display modes included in the head unit 110 include the following nine ways of transitions:

Mode 1<=>Mode 2
Mode 2<=>Mode 3
Mode 1<=>Mode 3
Mode 1->Mode 1
Mode 2->Mode 2
Mode 3->Mode 3

In the example illustrated in Table 800, among these nine ways of transition directions, in two ways of transition directions, the area to be identified can be limited to the center.

<Process of Identifying Changed Area>

Figure 9:
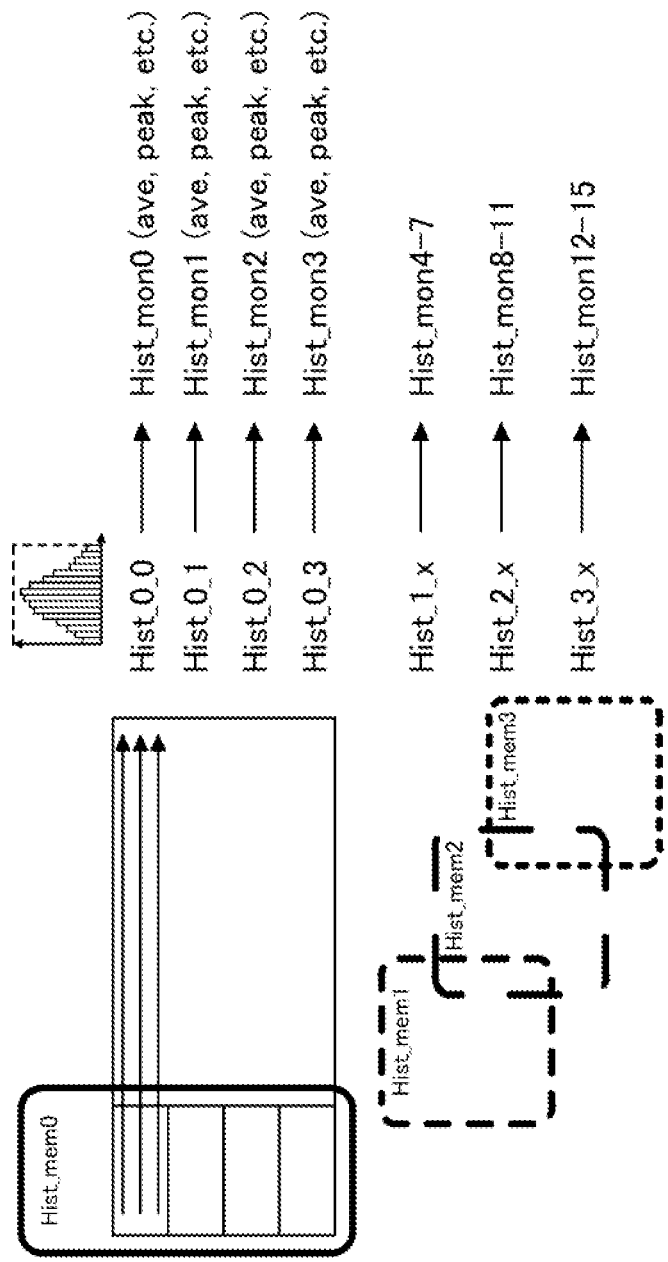
FIG. 9 is a diagram for describing a process of identifying a changed area in detail.

Next, a process of identifying a changed area by the changed area identifying unit 501 will be described in detail. FIG. 9 is a diagram for describing a process of identifying a changed area in detail. As illustrated in FIG. 9, the changed area identifying unit 501 divides a frame to be processed into four partitions in the vertical direction, and four partitions in the horizontal direction, to obtain 16 areas.

Here, assume that the histogram unit 603 of the local dimming control device 210_2 according to the first embodiment has 256 counters. The changed area identifying unit 501 allocates the 256 counters to four areas. The counters allocated to each of the areas (here, 64 counters per area) count the number of pixels classified into one of 64 tonal ranges (0 to 3, 4 to 7, 8 to 11, . . . , 248 to 251, and 252 to 255) in each of the areas.

Then, the histogram unit 603 generates histograms (Hist0_0, Hist0_1, . . . , and Hist3_3) for the respective areas. each of the generated histograms (Hist0_0, Hist0_1, . . . , and Hist3_3) is held in a predetermined area (one of Hist_mem0 to Hist_mem3) in the memory 602.

The changed area identifying unit 501 obtains the histograms (Hist0_0, Hist0_1, . . . , and Hist3_3) each held in the predetermined area (one of Hist_mem0 to Hist_mem3) in the memory 602.

Also, based on the obtained histograms (Hist0_0, Hist0_1, . . . , and Hist3_3), the changed area identifying unit 501 calculates parameters used for determining whether the image has changed in the respective areas. Here, parameters calculated by the changed area identifying unit 501 are denoted as Hist_mon0, Hist_mon1, . . . , and Hist_mon15. Note that a parameter includes, for example, an average value of pixel values, a peak value of pixel values, and the like.

Also, the changed area identifying unit 501 compares a parameter calculated for each of the areas with a parameter calculated for the corresponding area in the previous frame preceding the current frame to be processed, to determine whether the parameter has changed by a predetermined threshold value or greater. Then, in the case where it is determined that the parameter has changed by the predetermined threshold value or greater, the changed area identifying unit 501 identifies the area (changed area) and informs the histogram obtaining unit 502 of the identified changed area.

In this way, by setting an area to have a size with which a transition of the display mode can be detected, and setting a tonal range to have the number of tones with which a transition of the display mode can be detected, the changed area identifying unit 501 can monitor the entire frame with a limited number of counters.

<Description of Process of Obtaining Histograms>

Next, a process of obtaining histograms that obtains histograms for each block in an identified area column by column every time a frame is received will be described. FIGS. 10 and 11 are first and second diagrams illustrating specific examples of a process of obtaining histograms. Among these, FIG. 10 illustrates a case in which it is determined that an image has changed in all areas upon a transition from Mode 1 to Mode 2 or Mode 3, or a transition from Mode 2 or Mode 3 to Mode 1 in the head unit.

In FIG. 10, when the frame to be processed is shifted from a frame 1000 to a frame 1010, the changed area identifying unit 501 determines whether the parameter calculated for each of the areas has changed by the predetermined threshold value or greater. The example in FIG. 10 shows that the parameters (Hist_mon0, 2, 4, 5, 7, 8, 9, 11, 12, and 14) have changed by the predetermined threshold value or greater. In this case, the changed area identifying unit 501 identifies all areas as areas in which the image has changed.

The histogram obtaining unit 502 determines the number of columns in the case where all areas are identified as areas to be analyzed. Note that the example in FIG. 10 illustrates the case where one frame is partitioned into a total of 54 blocks of six vertical blocks by nine horizontal blocks, in accordance with the backlights. Also, the example in FIG. 10 illustrates the case where the number of columns is determined to be nine, as a vertical line of six blocks is defined as one column (Hist_mem_full) in accordance with the processing capability of the histogram unit 603.

According to the example in FIG. 10, the histogram obtaining unit 502 repeats the process of obtaining histograms for one column (six blocks) for nine frames every time a frame is received.

Specifically, the histogram obtaining unit 502,
in the first frame 1011, sequentially allocates 256 counters included in the histogram unit 603 to blocks 1 to 6 in the first column, and then, obtains histograms generated by the counters that are allocated to the blocks 1 to 6, to count the number of pixels of each of the tonal ranges;

in the second frame 1012, sequentially allocates 256 counters included in the histogram unit 603 to blocks 7 to 12 in the second column, and then, obtains histograms generated by the counters that are allocated to the blocks 7 to 12, to count the number of pixels of each of the tonal ranges;

in the third frame 1013, sequentially allocates 256 counters included in the histogram unit 603 to blocks 13 to 18 in the third column, and then, obtains histograms generated by the counters that are allocated to the blocks 13 to 18, to count the number of pixels of each of the tonal ranges;

in the fourth frame 1014, sequentially allocates 256 counters included in the histogram unit 603 to blocks 19 to 24 in the fourth column, and then, obtains histograms generated by the counters that are allocated to the blocks 19 to 24, to count the number of pixels of each of the tonal ranges;

in the fifth frame 1015, sequentially allocates 256 counters included in the histogram unit 603 to blocks 25 to 30 in the fifth column, and then, obtains histograms generated by the counters that are allocated to the blocks 25 to 30, to count the number of pixels of each of the tonal ranges;

in the sixth frame 1016, sequentially allocates 256 counters included in the histogram unit 603 to blocks 31 to 36 in the sixth column, and then, obtains histograms generated by the counters that are allocated to the blocks 31 to 36, to count the number of pixels of each of the tonal ranges;

in the seventh frame 1017, sequentially allocates 256 counters included in the histogram unit 603 to blocks 37 to 42 in the seventh column, and then, obtains histograms generated by the counters that are allocated to the blocks 37 to 42, to count the number of pixels of each of the tonal ranges;

in the eighth frame 1018, sequentially allocates 256 counters included in the histogram unit 603 to blocks 43 to 48 in the eighth column, and then, obtains histograms generated by the counters that are allocated to the blocks 43 to 48, to count the number of pixels of each of the tonal ranges; and in the ninth frame 1019, sequentially allocates 256 counters included in the histogram unit 603 to blocks 49 to 54 in the ninth column, and then, obtains histograms generated by the counters that are allocated to the blocks 49 to 54, to count the number of pixels of each of the tonal ranges.

Then, the feature extracting unit 404 extracts features from the histograms of the corresponding blocks that are obtained by the histogram obtaining unit 502 in each of the frames 1011 to 1019. In the case where all areas are to be identified as changed areas in a display mode after a transition according to the transition pattern of the display modes, the feature extracting unit 404 sets a range of areas to be analyzed in which the image is analyzed, to all the areas of the frame, to extract features.

On the other hand, FIG. 11 illustrates a case in which it is determined that an image has changed in central areas upon a transition from Mode 2 to Mode 3 or a transition from Mode 3 to Mode 2 in the head unit.

In FIG. 11, when the frame to be processed is shifted from a frame 1100 to a frame 1110, the changed area identifying unit 501 determines whether the parameter calculated for each of the areas has changed by the predetermined threshold value or greater. The example in FIG. 11 shows that the parameters (Hist_mon4, 5, 6, 7, 8, 9, and 10) have changed by the predetermined threshold value or greater. In this case, the changed area identifying unit 501 identifies the central areas as areas in which the image has changed.

Note that the example in FIG. 11 also illustrates a case where one frame is partitioned into a total of 54 blocks of six vertical blocks by nine horizontal blocks, and a vertical line of six blocks is defined as a single column (Hist_mem_full) in accordance with the processing capability of the histogram unit 603. Note that in the case of FIG. 11, the number of columns is determined to be five.

Therefore, the histogram obtaining unit 502 repeats the process of obtaining histograms for one column (six blocks) for five frames every time a frame is received.

Specifically, the histogram obtaining unit 502, in the first frame 1111, sequentially allocates 256 counters included in the histogram unit 603 to blocks 13 to 18 in the first column, and then, obtains histograms generated by the counters that are allocated to the blocks 13 to 18, to count the number of pixels of each of the tonal ranges;

in the second frame 1112, sequentially allocates 256 counters included in the histogram unit 603 to blocks 19 to 24 in the second column, and then, obtains histograms generated by the counters that are allocated to the blocks 19 to 24, to count the number of pixels of each of the tonal ranges;

in the third frame 1113, sequentially allocates 256 counters included in the histogram unit 603 to blocks 25 to 30 in the third column, and then, obtains histograms generated by the counters that are allocated to the blocks 25 to 30, to count the number of pixels of each of the tonal ranges;

in the fourth frame 1114, sequentially allocates 256 counters included in the histogram unit 603 to blocks 31 to 34 in the fourth column, and then, obtains histograms generated by the counters that are allocated to the blocks 31 to 34, to count the number of pixels of each of the tonal ranges; and in the fifth frame 1115, sequentially allocates 256 counters included in the histogram unit 603 to blocks 37 to 40 in the fifth column, and then, obtains histograms generated by the counters that are allocated to the blocks 37 to 40, to count the number of pixels of each of the tonal ranges.

Then, the feature extracting unit 404 extracts features from the histograms of the corresponding blocks that are obtained by the histogram obtaining unit 502 in each of the frames 1111 to 1115. In the case where central areas are to be identified as changed areas in a display mode after a transition according to the transition pattern of the display modes, the feature extracting unit 404 changes a range of areas to be analyzed in which the image is analyzed, to the central areas of the frame, to extract features.

In this way, in each frame, by limiting the number of blocks for which histograms are obtained to a number defining a single column, the histogram obtaining unit 502 can obtain highly precise histograms in which the tonal ranges are fine, by using a limited number of counters.

Also, by determining the number of columns according to a range of areas in a frame where changed areas are present, the histogram obtaining unit 502 can reduce the number of frames (the number of partitions in time) required for obtaining histograms.

<Flow of Local Dimming Process>

Figure 12:
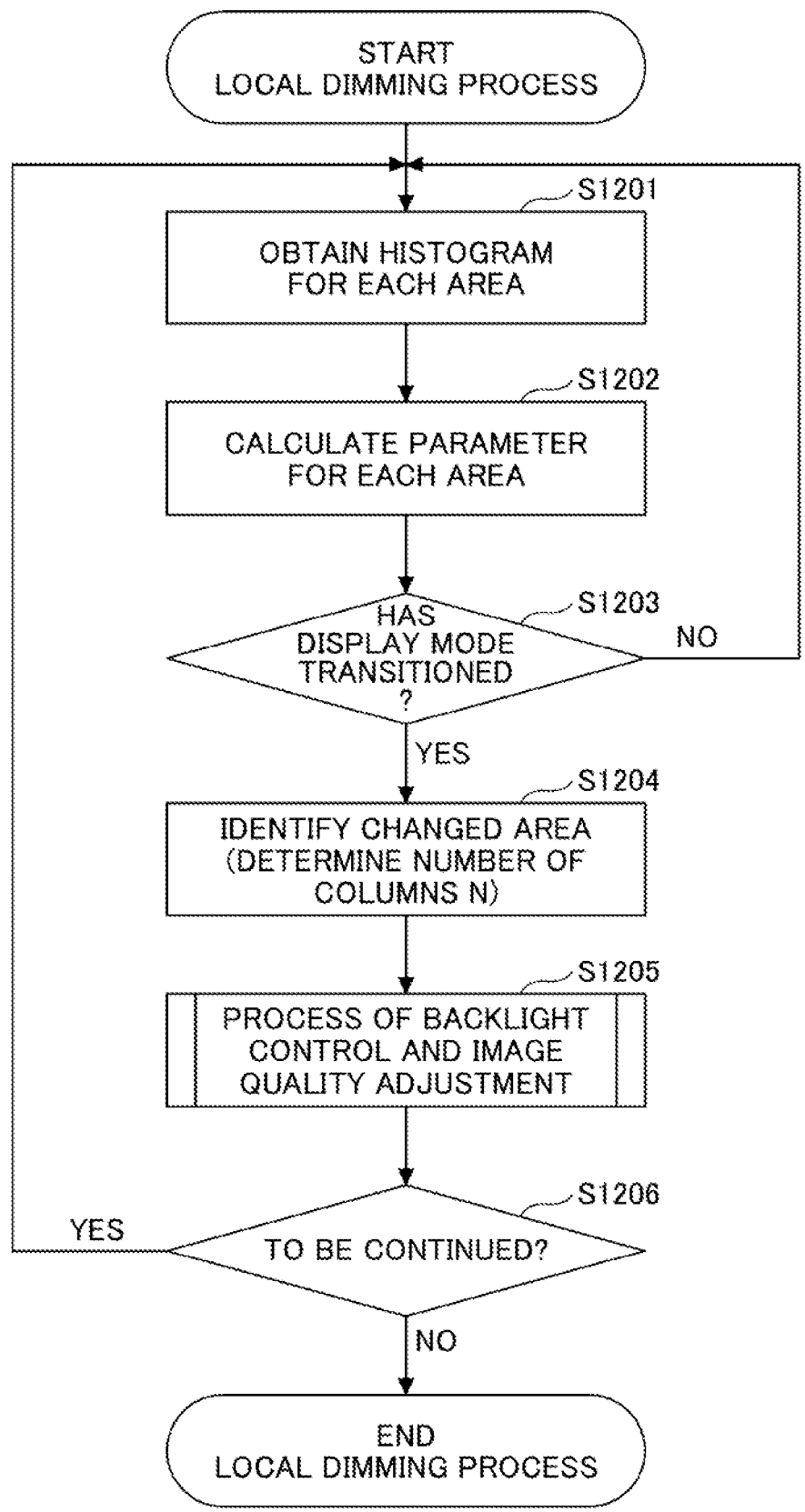
FIG. 12 is a flow chart illustrating a flow of a local dimming process.

Next, a flow of a local dimming process executed by the local dimming control device 210_2 will be described. FIG. 12 is a flow chart illustrating a flow of a local dimming process.

At Step S1201, the changed area identifying unit 501 allocates counters included in the histogram unit 603 to each area, to obtain histograms generated in each of the areas.

At Step S1202, the changed area identifying unit 501 calculates a parameter for each of the obtained histograms.

At Step S1203, based on the calculated parameters, the changed area identifying unit 501 determines whether the change of the image from the previous frame is greater than or equal to the predetermined threshold value. If it is determined at Step S1203 that the change is not greater than or equal to the predetermined threshold value, the changed area identifying unit 501 determines that the display mode has not transitioned (NO is determined at Step S1203), and returns to Step S1201.

On the other hand, if it is determined at Step S1203 that the change is greater than or equal to the predetermined threshold value, the changed area identifying unit 501 determines that the display mode has transitioned (YES is determined at Step S1203), and proceeds to Step S1204.

At Step S1204, the changed area identifying unit 501 identifies each changed area, and informs the histogram obtaining unit 502 of the area. Note that by identifying changed areas by the changed area identifying unit 501, the histogram obtaining unit 502 can determine the number of columns N.

At Step S1205, the histogram obtaining unit 502, the image quality adjusting unit 405, and the backlight control information generating unit 406 execute a process of backlight control and image quality adjustment. Note that the process of backlight control and image quality adjustment will be described in detail later with reference to FIG. 13.

At Step S1206, the changed area identifying unit 501 determines whether to continue the local dimming process. If it is determined at Step S1206 to continue (if YES is determined at Step S1206), the process returns to Step S1201.

On the other hand, if it is determined at Step S1206 not to continue the local dimming process (if NO is determined at Step S1206), the local dimming process ends.

<Flow of Process of Backlight Control and Image Quality Adjustment>

Figure 13:
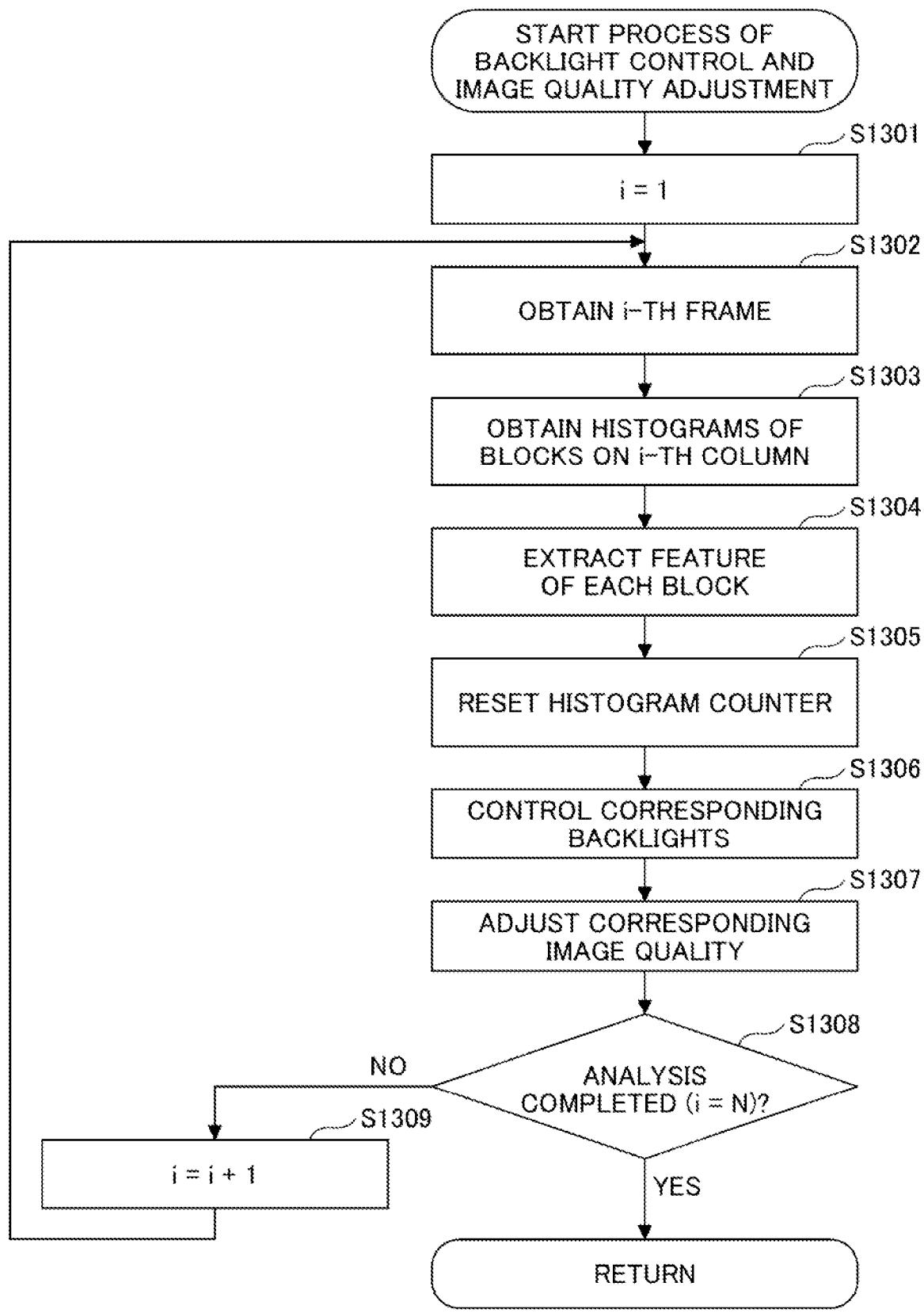
FIG. 13 is a flow chart illustrating a flow of a process of backlight control and image quality adjustment.

Next, a process of backlight control and image quality adjustment (Step S1205 in FIG. 12) will be described in detail. FIG. 13 is a flow chart illustrating a flow of a process of backlight control and image quality adjustment.

At Step S1301, the histogram obtaining unit 502 sets '1' to a frame counter i.

At Step S1302, the histogram obtaining unit 502 obtains the i-th frame.

At Step S1303, the histogram obtaining unit 502 allocates 256 counters included in the histogram unit 603 in areas identified in the i-th frame, for the blocks in the i-th column in the changed areas. Also, the histogram obtaining unit 502 obtains histograms generated for the respective blocks in the i-th column.

At Step S1304, the feature extracting unit 404 extracts features based on the obtained histograms of the respective blocks in the i-th column, and informs the image quality adjusting unit 405 and the backlight control information generating unit 406, of the features as analysis results.

At Step S1305, the histogram obtaining unit 502 resets the count values of the 256 counters included in the histogram unit 603.

At Step S1306, based on the informed analysis results, the backlight control information generating unit 406 generates and outputs control information for controlling backlights at the respective positions corresponding to the blocks in the i-th column.

At Step S1307, based on the informed analysis results, the image quality adjusting unit 405 adjusts the image quality for each block in the i-th column.

At Step S1308, the histogram obtaining unit 502 determines whether adjustment of the image quality and generation of the control information have been completed, for the areas identified at Step S1204 in FIG. 12. At Step S1308, if the frame counter i has not become equal to N, the histogram obtaining unit 502 determines that adjustment of the image quality and generation of the control information have not been completed (NO is determined at Step S1308), and proceeds to Step S1309.

At Step S1309, the histogram obtaining unit 502 increments the frame counter i, and returns to Step S1302.

On the other hand, at Step S1308, if the frame counter i has become equal to N, the histogram obtaining unit 502 determines that adjustment of the image quality and generation of the control information have been completed (YES is determined at Step S1308), and returns to Step S1206 in FIG. 12.

SUMMARY

As is obvious from the above description, the local dimming control device 210_2 according to the first embodiment, receives a frame to be displayed on the liquid crystal display, and identifies each changed area in which the image has changed;

in the case where changed areas in which the image has changed are identified, every time a frame to be displayed on the liquid crystal display is received, analyzes the image in the identified areas in the received frame column by column (the predetermined unit of processing);

every time an analysis result of the image with respect to one column (the predetermined unit of processing) is output, adjusts the image quality of the image in corresponding portions, and generates control information for controlling the corresponding backlights.

In this way, by the local dimming control device according to the first embodiment, a large-capacity frame memory that would be required for holding frames becomes unnecessary, and the size of the unit for analyzing an image can be reduced.

As a result, by the local dimming control device according to the first embodiment, in a display system executing a local dimming process, the circuit size on the liquid crystal display side can be reduced.

Second Embodiment

In the first embodiment described above, a configuration is adopted in which the changed area identifying unit 501 calculates parameters for areas in a frame, to identify changed areas in which the image has changed. However, the method of identifying changed areas of an image is not limited as such. For example, it may be configured such that for each display mode included in the head unit, each area that would change when transitioning to another display mode may be identified in advance, to obtain information on a transition of the display mode from the head unit, so as to identify the area as an area in which the image changes.

Also, in the first embodiment above, a configuration is adopted in which based on analysis results informed from the feature extracting unit 404, the image quality adjusting unit 405 adjusts the image quality, and the backlight control information generating unit 406 generates control information. However, the method of adjusting image quality by the image quality adjusting unit 405, and the method of generating control information by the backlight control information generating unit 406 are not limited as such. For example, it may be configured such that information on a transition of the display mode is obtained from the head unit, and based on the obtained information on the transition and analysis results, the image quality is adjusted and the control information is generated.

Other Embodiments

In the first and second embodiments described above, although the description assumes that the number of areas in one frame is 16 and the number of blocks in one column is six, the number of areas in one frame and the number of blocks in one column are not limited as such. Based on the resources included in the local dimming control device 210_2 (e.g., depending on the number of counters included in the histogram unit 603), the number of areas in one frame and the number of blocks in one column may be determined.

Also, in the first and second embodiments described above, although the description assumes that the number of blocks in one frame is 54, the number of blocks in one frame is not limited as such. For example, the number of blocks in one frame may be determined depending on the number of drivers that control the backlights included in the liquid crystal display 150.

Also, in the first and second embodiments described above, although the description assumes that 16 areas in a frame has the same size to each other, the 16 areas may include areas having different sizes. Similarly, in the first and second embodiments described above, although the description assumes that 54 blocks in a frame has the same size to each other, the 54 blocks may include blocks having different sizes.

Also, in the first and second embodiments described above, although the description assumes that the histogram unit 603 has 256 counters, the number of counters included in the histogram unit 603 is not limited as such.

Note that the present invention is not limited to the configurations described herein, which include the configurations in the above embodiments and configuration in which other elements are combined. In these regards, it is possible to alter a configuration within a range not deviating from the gist of the present invention, and the range can be appropriately determined according to the application form.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device that executes a local dimming process of a display, the control device comprising:
    a plurality of counters; and
    a processor configured to execute a process including:
        identifying a changed area in which an image is changed in a frame to be displayed on the display, the frame being divided into a plurality of blocks in both a horizontal direction and a vertical direction, and also divided into a plurality of first units for processing in the horizontal direction, each of the plurality of first units for processing including corresponding ones of the plurality of blocks which are arranged in the vertical direction,
        analyzing, in a case where the changed area is identified, every time the frame is received, a part of the image in the changed area in the received frame, in a corresponding one of the plurality of first units for processing so that a whole of the image in the changed area is analyzed in all of the plurality of first units for processing over multiple frames by time division processing, and
        generating control information for controlling the local dimming process for a corresponding area on the display, every time an analysis result with respect to the image in one of the plurality of first units for processing is output,
    wherein the plurality of blocks are units for obtaining histograms, the histograms being obtained by allocating the plurality of counters to the corresponding ones of the plurality of blocks which are arranged in the vertical direction and counting a number of pixels of a tonal range in the corresponding ones of the plurality of blocks which are arranged in the vertical direction.

2. The control device as claimed in claim 1, wherein the identifying identifies the changed area by comparing a parameter calculated from histograms of the image in respective areas in a frame to be processed, with a parameter calculated from histograms of an image in corresponding areas in a previous frame preceding the frame to be processed.

3. The control device as claimed in claim 1, wherein the identifying identifies the changed area, based on a signal from a head unit configured to output the image to be displayed on the display.

4. The control device as claimed in claim 1, wherein the generating adjusts, every time the analysis result with respect to the image in the one of the plurality of first units for processing is output, image quality of the image in a corresponding portion.

5. The control device as claimed in claim 1, the processor is further configured to execute obtaining, in a case where the changed area is identified, every time a frame to be displayed on the display is received, histograms of the image in the changed area in the received frame, in the corresponding ones of the plurality of blocks which are arranged in the vertical direction.

6. The control device as claimed in claim 5, wherein the analyzing analyzes the image in the changed area, based on the histograms obtained by the obtaining unit, in the corresponding ones of the plurality of blocks which are arranged in the vertical direction.

7. The control device as claimed in claim 1, wherein the analyzing changes a range of areas to be analyzed in which the image is analyzed in the changed area, according to a range in the frame in which the changed area is present.

8. The control device as claimed in claim 1, wherein the analyzing changes a range of areas to be analyzed in which the image is analyzed in the changed area, according to a transition pattern among a plurality of display modes.

9. The control device as claimed in claim 1, wherein; the display is a liquid crystal display, and
    the generating generates control information for controlling a corresponding backlight, every time the analysis result with respect to the image in the one of the plurality of first units for processing is output.

10. A control method of a local dimming process of a display, executed by a control device, the control method comprising:
    identifying a changed area in which an image is changed in a frame to be displayed on the display, the frame being divided into a plurality of blocks in both a horizontal direction and a vertical direction, and also divided into a plurality of first units for processing in the horizontal direction, each of the plurality of first units for processing including corresponding ones of the plurality of blocks which are arranged in the vertical direction;
    analyzing, as a result that the changed area is identified, every time the frame is received, a part of the image in the changed area in the received frame, in a corresponding one of the plurality of first units for processing so that a whole of the image in the changed area is analyzed in all of the plurality of first units for processing over multiple frames by time division processing; and
    generating control information for controlling the local dimming process for a corresponding area on the display, every time an analysis result with respect to the image in one of the plurality of first units for processing is output,
    wherein the plurality of blocks are units for obtaining histograms, the histograms being obtained by allocating a plurality of counters to the corresponding ones of the plurality of blocks which are arranged in the vertical direction is and counting a number of pixels of a tonal range in the corresponding ones of the plurality of blocks which are arranged in the vertical direction.

11. The display method as claimed in claim 10, wherein the identifying identifies the changed area by comparing a parameter calculated from histograms of the image in respective areas in a frame to be processed, with a parameter calculated from histograms of an image in corresponding areas in a previous frame preceding the frame to be processed.

12. The display method as claimed in claim 10, wherein the identifying identifies the changed area, based on a signal from a head unit configured to output the image to be displayed on the display.

13. The display method as claimed in claim 10, the control method further includes obtaining, as the result that the changed area is identified, every time a frame to be displayed on the display is received, histograms of the image in the changed area in the received frame, in the corresponding one of the plurality of first units for processing.

14. The display method as claimed in claim 10, wherein the analyzing changes a range of areas to be analyzed in which the image is analyzed in the changed area, according to a range in the frame in which the changed area is present.

15. The display method as claimed in claim 10, wherein the analyzing changes a range of areas to be analyzed in which the image is analyzed in the changed area, according to a transition pattern among a plurality of display modes.

16. A display system comprising:

a head unit;

a display; and a control device including a plurality of counters; and a processor configured to execute a process including:

identifying a changed area in which an image is changed in a frame to be displayed on the display, the frame being divided into a plurality of blocks in both a horizontal direction and a vertical direction, and also divided into a plurality of first units for processing in the horizontal direction, each of the plurality of first units for processing including corresponding ones of the plurality of blocks which are arranged in the vertical direction, analyzing, in a case where the changed area is identified, every time the frame is received, a part of the image in the changed area in the received frame, in a corresponding one of the plurality of first units for processing so that a whole of the image in the changed area is analyzed in all of the plurality of first units for processing over multiple frames by time division processing, and generating control information for controlling the local dimming process for a corresponding area on the display, every time an analysis result with respect to the image in one of the plurality of first units for processing is output, wherein the plurality of blocks are units for obtaining histograms, the histograms being obtained by allocating the plurality of counters to the corresponding ones of the plurality of blocks which are arranged in the vertical direction and counting a number of pixels of a tonal range in the corresponding ones of the plurality of blocks which are arranged in the vertical direction.

17. The display system as claimed in claim 16, wherein the identifying identifies the changed area by comparing a parameter calculated from histograms of the image in respective areas in a frame to be processed, with a parameter calculated from histograms of an image in corresponding areas in a previous frame preceding the frame to be processed.

18. The display system as claimed in claim 16, wherein the identifying identifies the changed area, based on a signal from the head unit configured to output the image to be displayed on the display.

19. The display system as claimed in claim 16, wherein the processor further executes obtaining, in a case where the changed area is identified, every time a frame to be displayed on the display is received, histograms of the image in the changed area in the received frame, in the corresponding one of the plurality of first units for processing.

20. The display system as claimed in claim 16, wherein the analyzing unit changes a range of areas to be analyzed in which the image is analyzed in the changed area, according to a range in the frame in which the changed area is present.

* * * * *